(12) United States Patent
Nymberg et al.

(10) Patent No.: US 12,709,461 B2
(45) Date of Patent: Aug. 18, 2026

(54) COATED FABRIC SEAL AND RELATED METHODS

(71) Applicant: Mesa Industries, Inc., Cincinnati, OH (US)

(72) Inventors: Timothy R. Nymberg, Cincinnati, OH (US); Adam K. Vance, Cincinnati, OH (US)

(73) Assignee: Mesa Industries, Inc., Cincinnati, OH (US)

( * ) Notice: Subject to any disclaimer, the term of this patent is extended or adjusted under 35 U.S.C. 154(b) by 683 days.

(21) Appl. No.: 18/098,434

(22) Filed: Jan. 18, 2023

(65) Prior Publication Data

US 2023/0227248 A1 Jul. 20, 2023

Related U.S. Application Data

(60) Provisional application No. 63/300,803, filed on Jan. 19, 2022.

(51) Int. Cl.
*B65D 88/50* (2006.01)
*B32B 27/32* (2006.01)

(52) U.S. Cl.
CPC .............. *B65D 88/50* (2013.01); *B32B 27/32* (2013.01)

(58) Field of Classification Search
CPC ................................ B32B 27/32; B65D 88/50
See application file for complete search history.

(56) References Cited

U.S. PATENT DOCUMENTS

| | | | | |
|---|---|---|---|---|
| 4,406,377 | A | 9/1983 | Bruening | |
| 5,084,352 | A | 1/1992 | Percec et al. | |
| 6,155,449 | A | 12/2000 | Moriyama | |
| 2005/0137342 | A1 | 6/2005 | Krishnaswamy et al. | |
| 2014/0272229 | A1 * | 9/2014 | Xing | C08J 9/06 156/244.11 |
| 2015/0102033 | A1 | 4/2015 | Banovic | |
| 2019/0119026 | A1 | 4/2019 | Lewis | |

FOREIGN PATENT DOCUMENTS

| | | | | |
|---|---|---|---|---|
| GB | 2083234 | * | 3/1982 | G01M 3/20 |
| GB | 2083234 A | * | 3/1982 | G01M 3/2869 |

OTHER PUBLICATIONS

International Search Report and Written Opinion dated Jun. 16, 2023 for Application No. PCT/US23/11007, 15 pages.
Chinese First Office Action for CN 2023800209442, mailed Jan. 29, 2026.

* cited by examiner

*Primary Examiner* — Michael C Miggins
(74) *Attorney, Agent, or Firm* — FBT Gibbons LLP

(57) ABSTRACT

A storage system for a petroleum product and related methods includes a vapor barrier including at least one layer having an ultra high molecular weight polyethylene material configured to inhibit absorption of a petroleum product therethrough. Such vapor barrier may be a coated fabric with the ultra high molecular weight polyethylene material and be configured to fluidly seal against a surface. The vapor barrier is further configured to be incorporated into any such storage system, which further includes a floating roof seal, a tank liner seal, and/or a leg boot seal.

20 Claims, 8 Drawing Sheets

110
117
112
126
56
114
116

COATED FABRIC SEAL AND RELATED METHODS

CROSS-REFERENCE TO RELATED APPLICATION

This application claims priority to U.S. Pat. App. No. 63/300,803, entitled "Coated Fabric Seal and Related Methods," filed Jan. 19, 2022, the disclosure of which is incorporated by reference herein in its entirety.

TECHNICAL FIELD

The present invention relates generally to a coated fabric seal and related methods and, more particularly, to a coated fabric seal for storing a petroleum product.

BACKGROUND

Storage systems for a petroleum product, such as crude oil and petrochemicals, generally contain large quantities of fluid, including liquid and gas, at various volumes as this petroleum product is added and/or removed from a storage tank during use. Such storage tanks are subject to harsh environments created at least in part by the petroleum product as well as the desire for durable and effective sealing.

By way of example, in the above ground storage tank industry, a floating roof is incorporated into many tanks that store particularly volatile petroleum-based compounds. The floating roof sits on top of the fluid stored in the tank, as the fluid rises and falls in the tank, the floating roof moves accordingly. The floating roof typically does not contact the shell or wall of the tank such that a "rim space" is left as a gap between the floating roof and the tank wall. A method to provide sealing for this rim space is to utilize a liquid mounted foam log. The liquid mounted foam log rests on the surface of the fluid and occupies the rim space between the floating roof and the tank wall. As the rim space expands and contracts, the foam log expands and contracts into the space, providing a generally constant and continuous seal about the tank wall.

In some instances, the foam log seal may fail at a vapor fabric barrier. When this vapor barrier fabric fails (e.g., such as through abrasion, cuts, and/or tears), the petroleum product stored within the storage tank soaks into a foam material of the foam log. Once sufficiently soaked with the petroleum product, the foam material loses its resiliency and, in turn, loses its effectiveness to seal within the storage tank. Additionally, the foam material soaked with the petroleum product will continue to create emissions when the storage tank is emptied, creating additional environment hazard and becoming an environmental disposal problem.

Accordingly, there is a need for a seal that addresses the present challenges such as those discussed above.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
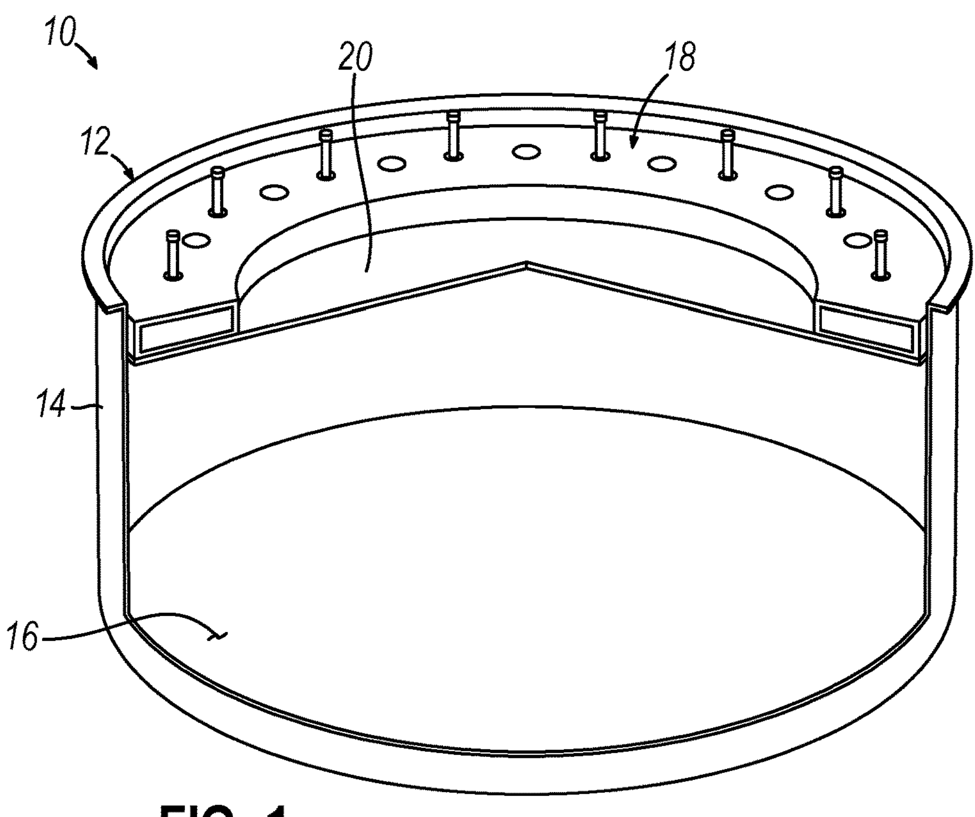
FIG. 1 depicts a perspective sectional view of a first example of a storage system for storing a petroleum product including a storage tank with a first exemplary seal system including an exemplary foam log seal with an annular vapor barrier.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

For clarity of disclosure, to the extent that such terms may be used herein, the terms "vertical," "horizontal," and "radial" are defined herein relative to a circular storage tank positioned on a ground surface. In this respect, "lower vertical direction" is toward to the ground, "upper vertical direction" is away from the ground, "left horizontal direction" is circumferentially left parallel to the ground, "right horizontal direction" is circumferentially right parallel to the ground, and "radial direction" is toward or away from an outer wall of the storage tank relative to a central axis of the storage tank. It will be further appreciated that, for convenience and clarity, spatial terms such as "upper," "lower," "lateral," "inner," "outer," "leftward," "rightward," and "central" also are used herein for reference to relative positions and directions. Such terms may be used below with reference to views as illustrated for clarity and are not intended to limit the invention described herein.

Aspects of the present examples described herein may be integrated into a storage system for a petroleum product, such as crude oil, which may also be referred to herein as petroleum, refined petroleum, which may also be referred to herein as petrochemicals, and generally any volatile, flammable chemical with a low vapor pressure. More broadly, such aspects may be incorporated into any such storage system for fluidly sealing at a tank wall. As used herein the term "fluidly sealing" and "sealing" refers to a sufficient seal for storing petrochemicals as will be appreciated by one of ordinary skill in the art. At least some leakage of vapor, such as petrochemical related vapors, may occur in use and still be considered "fluidly sealed" and "sealed" for the purpose of the examples described below and integrated into an exemplary storage system. The invention is thus not intended to be unnecessary limited to a complete, perfect fluid seal being formed by a seal nor should the invention be unnecessarily limited to use with petroleum products.

I. FIRST EXAMPLE OF A STORAGE SYSTEM FOR A PETROLEUM PRODUCT

Figure 2:
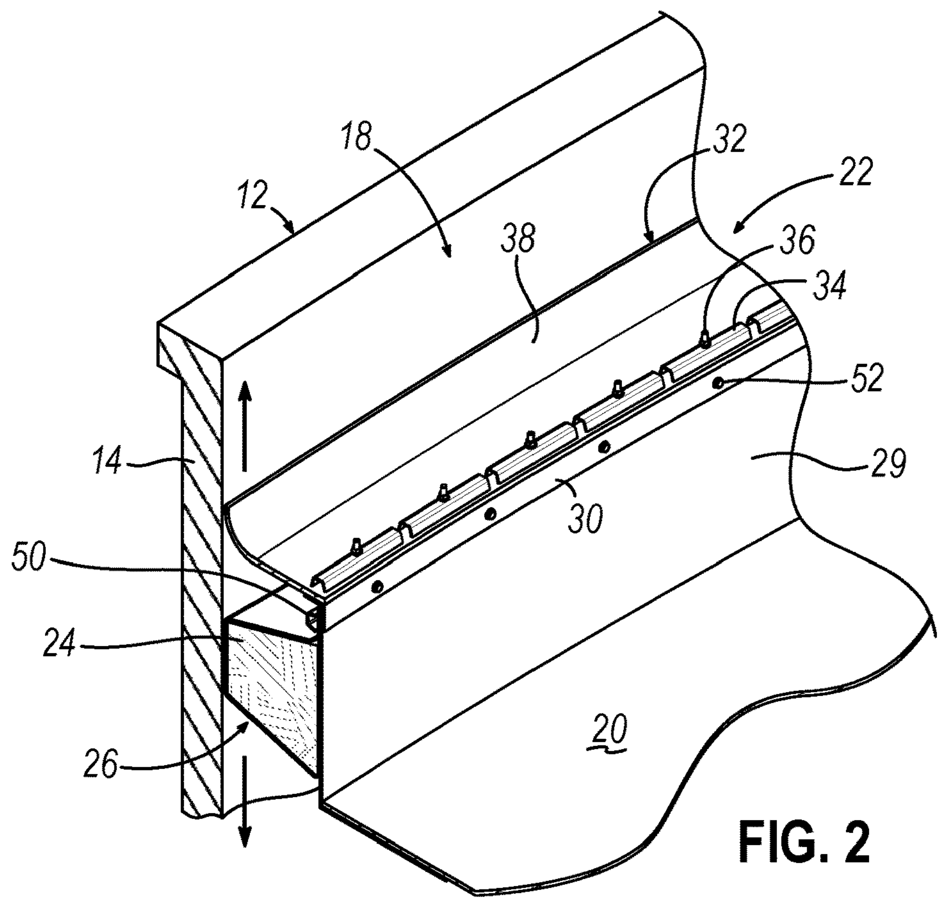
FIG. 2 depicts an enlarged perspective sectional view of at least a portion of the seal system and the storage tank of FIG. 1.

FIGS. 1-2 show a first example of a storage system (10) including a storage tank (12) having a tank wall (14), a tank floor (16), and an exemplary floating roof system (18) suspended above tank floor (16) for storing a petroleum product within storage tank (12). Tank wall (14) extends in a vertical direction upward from tank floor (16) and is generally circular in the present example, although alternative shapes and sizes may differ from storage tank (12) in other examples. Floating roof system (18) is sized and shaped to accommodate tank wall (14) while sufficiently sealing the petroleum product, particularly associated vapors, within the storage tank (12) to accommodate local regulations while accommodating vertical movement of floating roof system (18) resulting from differing amounts of petroleum product and environmental changes during use. To this end, floating roof system (18) has a floating roof (20) and an exemplary floating roof seal (22), which extends between floating roof (20) and an inner surface of tank wall (14), for sufficient sealing therebetween.

Figure 3:
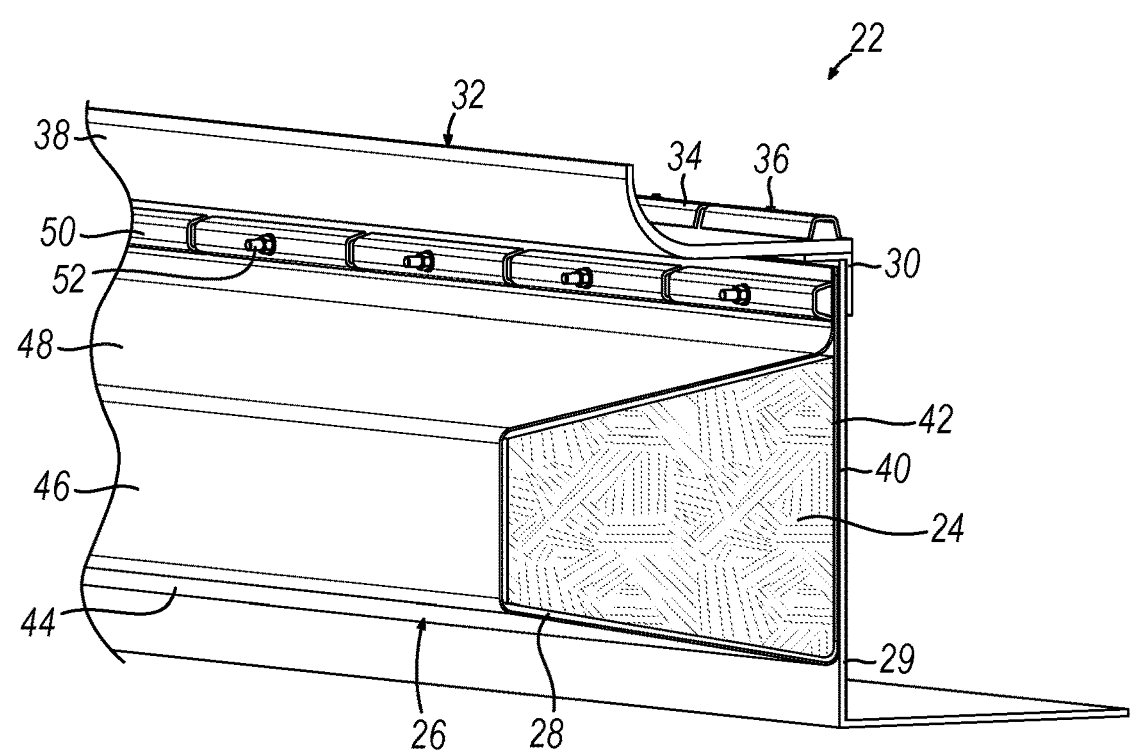
FIG. 3 depicts a perspective sectional view of the foam log seal of FIG. 1.

As shown in FIGS. 2-3, floating roof seal (22) is more particularly an exemplary foam log seal (22) including an annular foam member (24), which may also be referred to herein as a foam "log" and include any number of discrete pieces to define such annular shape. Foam log seal (22) further includes an annular vapor barrier (26) defining an annular hollow (28) configured to receive and fluidly seal annular foam member (24) therein to inhibit the petroleum product, including any portions thereof, from absorbing through annular vapor barrier (26) and into annular foam member (24) to thereby provide chemical resistance from the petroleum product to annular foam member (24).

In order to support annular vapor barrier (26) with annular foam member (24) therein against tank wall (14), foam log seal (22) further includes a base plate (29), which may be incorporated into floating roof (20) in one example, a rim riser (30) extending upward from base plate (29), and a wedge wiper seal (32) secured to rim riser (30) and extending radially outward to also engage with tank wall (14). Wedge wiper seal (32) is more particularly secured to rim riser (30) by a plurality of wedge brackets (34) and fasteners (36) and radially extends outward therefrom to an arcuate projection end (38) configured to engage tank wall (14) and wipe petroleum product from tank wall (14) during upward and downward movement of floating roof (20) during use. While wedge wiper seal (32) is shown as a secondary seal in the present example, an alternative foam log seal may not include a secondary seal, such as wedge wiper seal (32). The invention is thus not intended to be unnecessarily limited to use with wedge wiper seal (32).

Figure 4:
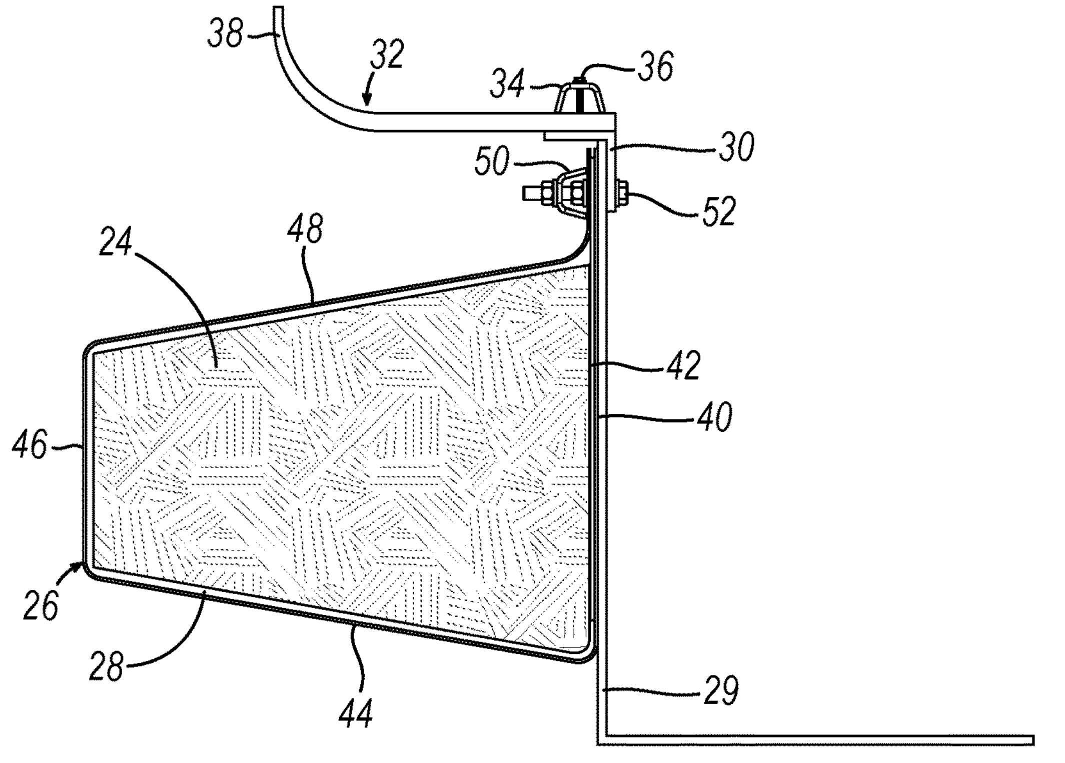
FIG. 4 depicts a sectional end view of the foam log seal of FIG. 1.
Figure 5:
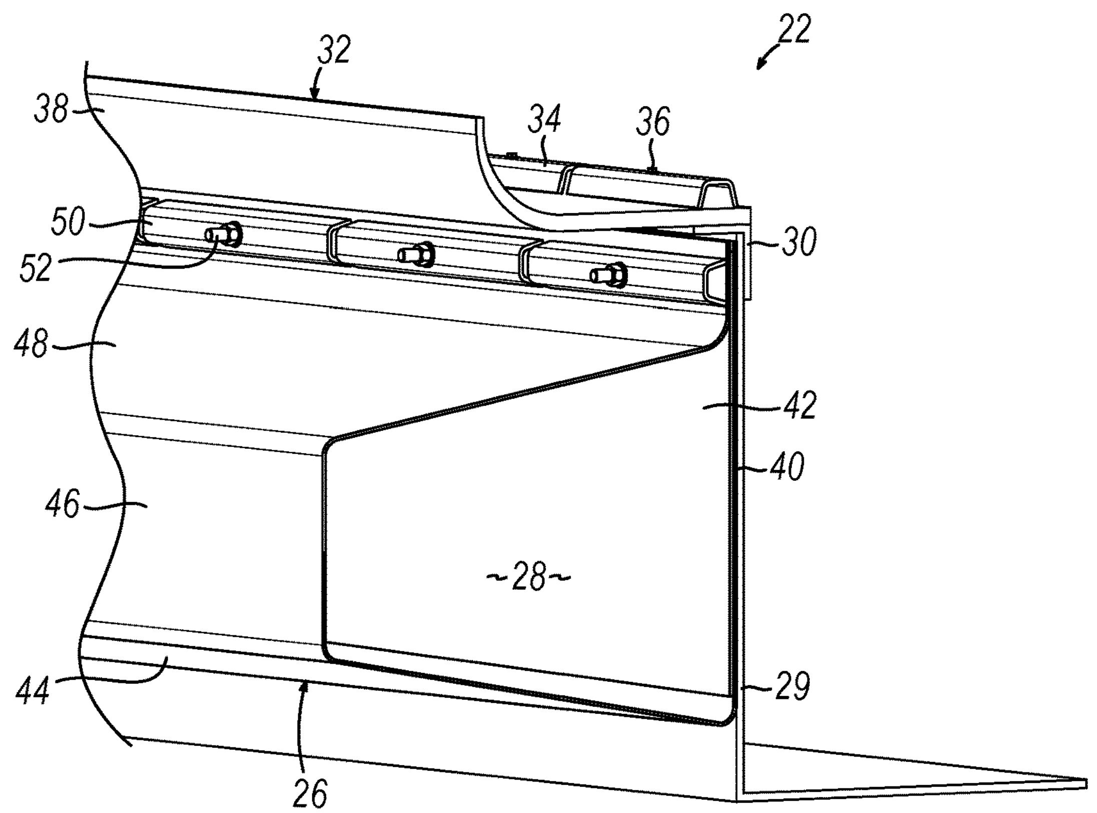
FIG. 5 depicts an enlarged, perspective sectional view of the foam log seal of FIG. 1 with a foam log hidden for greater clarity of the annular vapor barrier of FIG. 1.
Figure 6:
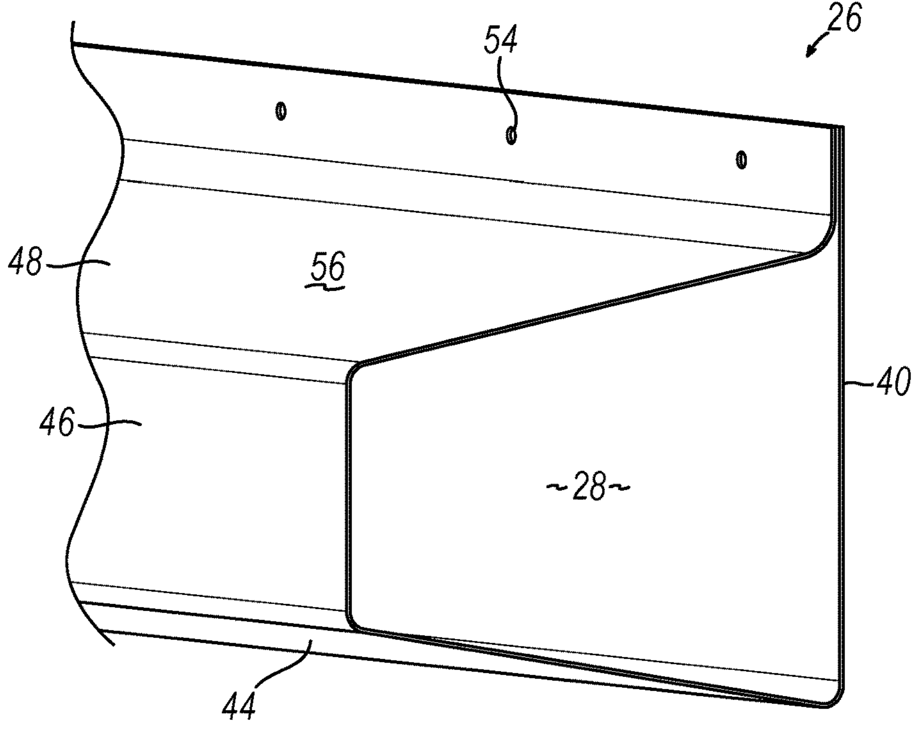
FIG. 6 depicts a perspective sectional view of the annular vapor barrier FIG. 5 formed of a coated fabric.

With respect to FIGS. 4-5, an inner portion (40) of annular vapor barrier (26) is received against an outer surface of base plate (29) and sandwiched between a log mounting plate (42) and base plate (29). Annular foam member (24) attaches to log mounting plate (42) with annular vapor barrier (26) having lower portion (44), outer portion (46), and upper portion (48) wrapped about annular foam member (24) such that annular vapor barrier (26) surrounds annular foam member (24). End portions of inner and upper portions (40, 48) are fastened to base plate (29) through log mounting plate (42) via a plurality of barrier brackets (50) and fasteners (52). Annular foam member (24) is thus captured within annular hollow (28) and fluidly sealed within annular vapor barrier (26). FIG. 6 shows annular vapor barrier (26) with ends of inner portion (40) and upper portion (48) having successive holes (54) configured to receive fasteners (52). Such holes (54) are pre-formed in one example before receiving fasteners (52). Annular vapor barrier (26) in the present example includes a material, such as a coated fabric (56), particularly configured to be flexible while retaining sufficient durability for use in the above ground storage tank industry. As used herein, the term flexible refers to coated fabric (56) flexing so as to deflect, such as by deforming, including bending, without materially failing.

Figure 7:
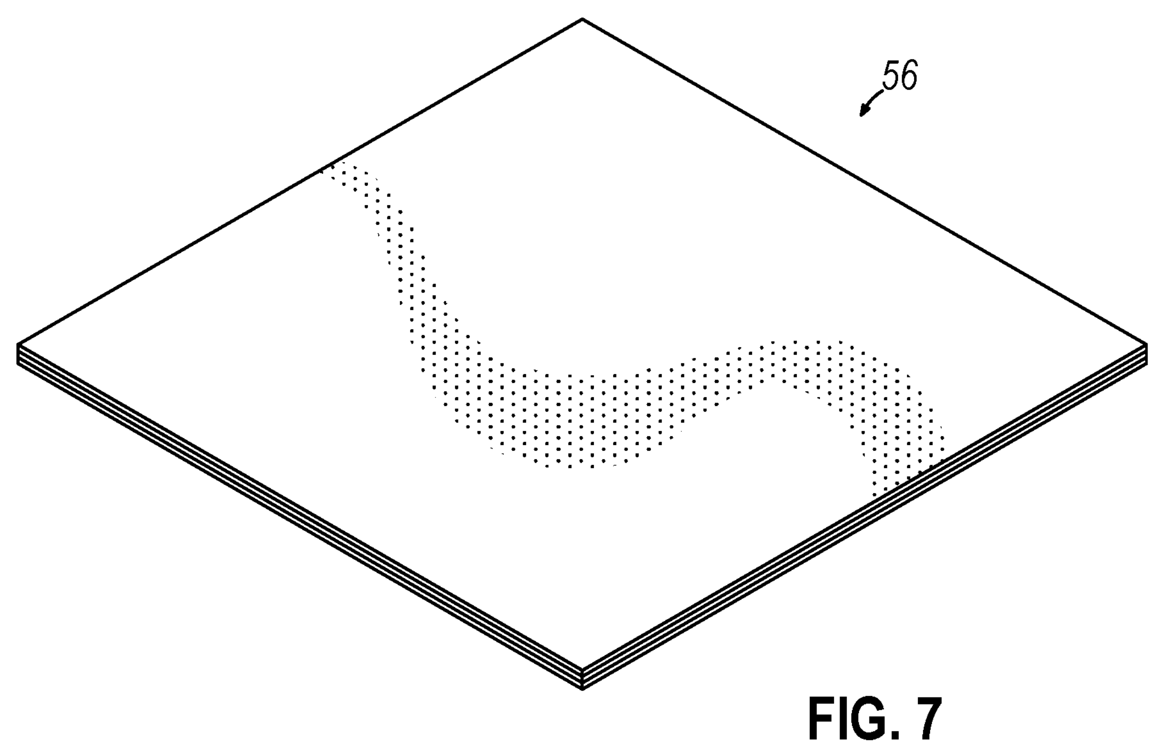
FIG. 7 depicts a schematic perspective view of the coated fabric of FIG. 6.
Figure 8:
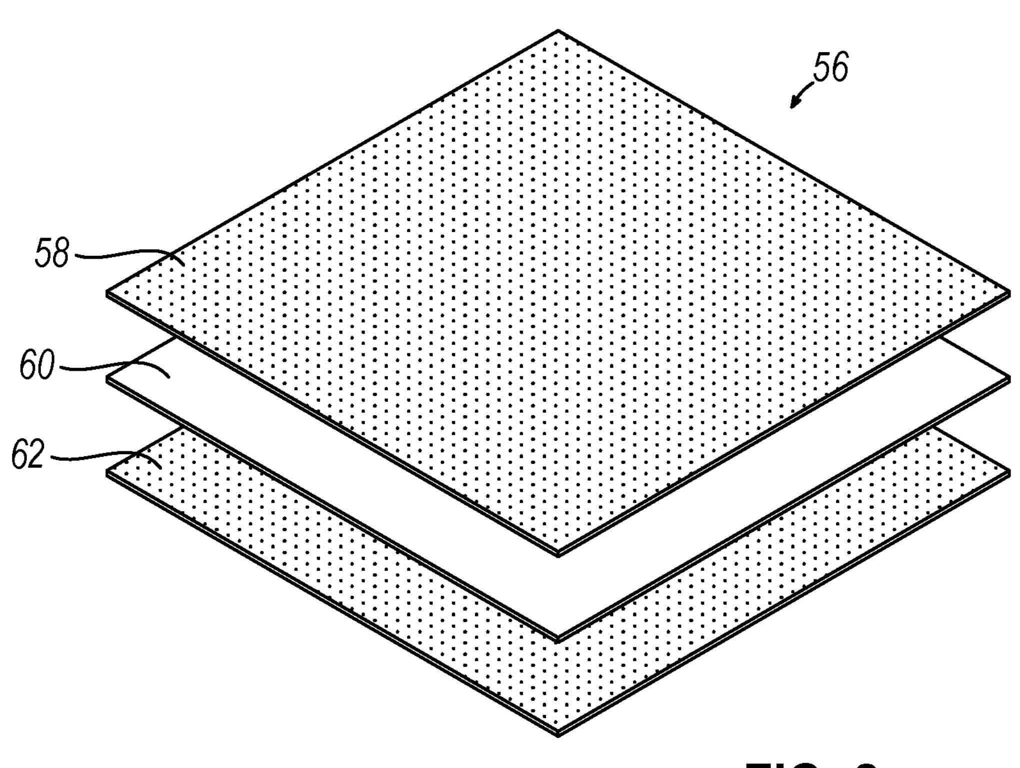
FIG. 8 depicts an exploded, schematic perspective view of the coated fabric of FIG. 7.

To this end, FIGS. 7-8 show such coated fabric (56) of annular vapor barrier (26) (see FIG. 6) in the present example more particularly including a first polyethylene film layer (58), a polyester scrim layer (60), and a second polyethylene film layer (62). These polyethylene film layers (58, 62) provide chemical compatibility of petroleum product received thereagainst as well as resistance to abrasion to reduce the likelihood of wear, cuts and tears during use. Polyester scrim layer (60), which may be a woven material, such as fabric fibers, is shown sandwiched between polyethylene film layers (58, 62) and may be manufactured collectively as coated fabric (56) in a continuous roll for then being formed into annular vapor barrier (26). In one example, scrim layer (60) and polyethylene film layers (58, 62) are secured together by lamination, although alternative securement may be performed such that the invention is not intended to be limited to laminating scrim layer (60) and polyethylene film layers (58, 62) together. While the present example includes two polyethylene film layers (58, 62), another example may include one outer polyethylene film layer (58) secured to polyester scrim layer (60) without additional polyethylene film layer (62). The invention is thus not intended to be limited to the particular arrangement of polyethylene film layers (58, 62) as shown in the present example.

Polyethylene film layers (58, 62) of the present example each include ultra high molecular weight polyethylene, which may also be referred to herein as UHMW polyethylene, and is a form of polyethylene with excellent abrasion resistance and excellent friction reduction qualities. In contrast to a larger thickness being limited in size, shape, and flexibility, in one example, each UHMW polyethylene film layer (58, 62) has a predetermined layer thickness configured to be relatively flexible for foam log seal applications while retaining sufficient durability for use in the above ground storage tank industry. To this end, in one example, each UHMW polyethylene film layer (58, 62) has a thickness greater than approximately 0.001 inch. In one example, each UHMW polyethylene film layer (58, 62) has a thickness less than approximately 0.25 inch. In one example, each UHMW polyethylene film layer (58, 62) has a thickness of approximately 0.001 inch to approximately 0.125 inch. In one example, each UHMW polyethylene film layer (58, 62) has a thickness of approximately 0.007 inch to approximately 0.055 inch. In one example, each UHMW polyethylene film layer (58, 62) has a thickness of approximately 0.012 inch. In one example, each UHMW polyethylene film layer (58, 62) has a thickness of approximately 0.001 inch to approximately 0.007 inch. In one example, each UHMW polyethylene film layer (58, 62) has a thickness of approximately 0.007 inch to approximately 0.012 inch. In one example, each UHMW polyethylene film layer (58, 62) has a thickness of approximately 0.012 inch to approximately 0.055 inch. In one example, each UHMW polyethylene film layer (58, 62) has a thickness of approximately 0.055 inch to approximately 0.125 inch. While the above examples have each UHMW polyethylene film layer (58, 62) with like predetermined layer thicknesses, and in at least one example same predetermined layer thicknesses, such UHMW polyethylene film layer (58, 62) may be different in other examples. The invention is thus not intended to be limited to the predetermined layer thickness of first UHMW polyethylene film layer (58) having a same predetermined layer thickness of second UHMW polyethylene film layer (62).

Collectively, in view of the above predetermined layer thickness of each UHMW polyethylene film layer (58, 62), the arrangement of polyethylene film layer (58, 62) with polyester scrim layer (60) as coated fabric (56) has a collective predetermined material thickness of greater than approximately 0.02 inches. In one example, polyethylene film layer (58, 62) with polyester scrim layer (60) as coated fabric (56) has a collective predetermined material thickness of less than approximately 0.5 inches. In one example, polyethylene film layer (58, 62) with polyester scrim layer (60) as coated fabric (56) has a collective predetermined material thickness of approximately 0.02 inches to approximately 0.5 inches. In one example, polyethylene film layer (58, 62) with polyester scrim layer (60) as coated fabric (56) has a collective predetermined material thickness of approximately 0.020 inches. In one example, polyethylene film layer (58, 62) with polyester scrim layer (60) as coated fabric (56) has a collective predetermined material thickness of approximately 0.035 inches. Again, such predetermined thickness is generally thick enough to provide sufficient durability for use in the above ground storage tank industry while remaining sufficiently flexible for such applications, including foam log applications and other such applications as those described herein.

As collectively laminated into coated fabric (56), the following technical specifications represent coated fabric (56) with a first collective predetermined material thickness of approximately 0.025 inches and coated fabric (56) with a thicker, second collective predetermined material thickness of approximately 0.030 inches. Such collective predetermined material thickness may also be referred to as material gauge. The following material specifications are merely exemplary and not intended to unnecessarily limit the invention. All of the following numerical material properties are approximate.

TABLE 1

Material Properties of Coated Fabric with UHMW Polyethylene

| Material Property | Unit | First Predetermined Thickness of 0.025 Inches | Second Predetermined Thickness of 0.030 Inches |
|---|---|---|---|
| Mass (ASTM D751) | ounce/yard$^2$ | 13.5 | 17.1 |
| Maximum Width | inches | 60 | 60 |
| Breaking Strength | pound-force (length) | 174.6 | 233.7 |
| Grab Method (ASTM D751) | pound-force (width) | 173.4 | 232.5 |
| Tear Strength | pound-force (length) | 103.8 | 75.7 |
| Trapezoid Tear (ASTM D571) | pound-force (width) | 65.9 | 52.0 |
| Hydrostatic Resistance (ASTM D571) | pounds per square inch $H_20$/failure | 246 | 277 |
| Puncture Resistance (ASTM D571) | pound-force | 39.3 | 47.4 |
| Bursting Strength (Diaphragm Burst ASTM D571) | pounds per square inch | 294 | 343 |
| Low Temp Cold Cracking (ASTM D571) | −40 degrees Celsius | None | None |
| Moisture Vapor Transmission (ASTM E96-16 Procedure B) | grams/ meter$^2$/ 24 hours | 0 | 5 |
| Abrasion Resistance (Cycles) Taber Wheel H-22/1 KG | cycles to hole | Greater than 200,000 | Greater than 200,000 |

While the present example discussed above provides the UHMW polyethylene film layers (58, 62) in a primary seal, such as with foam log (22), one or more UHMW polyethylene film layers (58, 62) film may similarly be incorporated into secondary seals, such as a scuff band, for such storage applications. In one or more examples, one or more UHMW polyethylene film layer (58, 62) may be incorporated into a secondary seal. Indeed, as will be discussed to some extent below in greater detail, any such UHMW polyethylene film layer (58, 62) has wide applications in these storage systems may be readily incorporated into other aspects of these storage systems such that the invention is not intended to be unnecessarily limited to the foam log application shown and described above.

II. SECOND EXAMPLE OF A STORAGE SYSTEM FOR A PETROLEUM PRODUCT

Figures 9, 10:
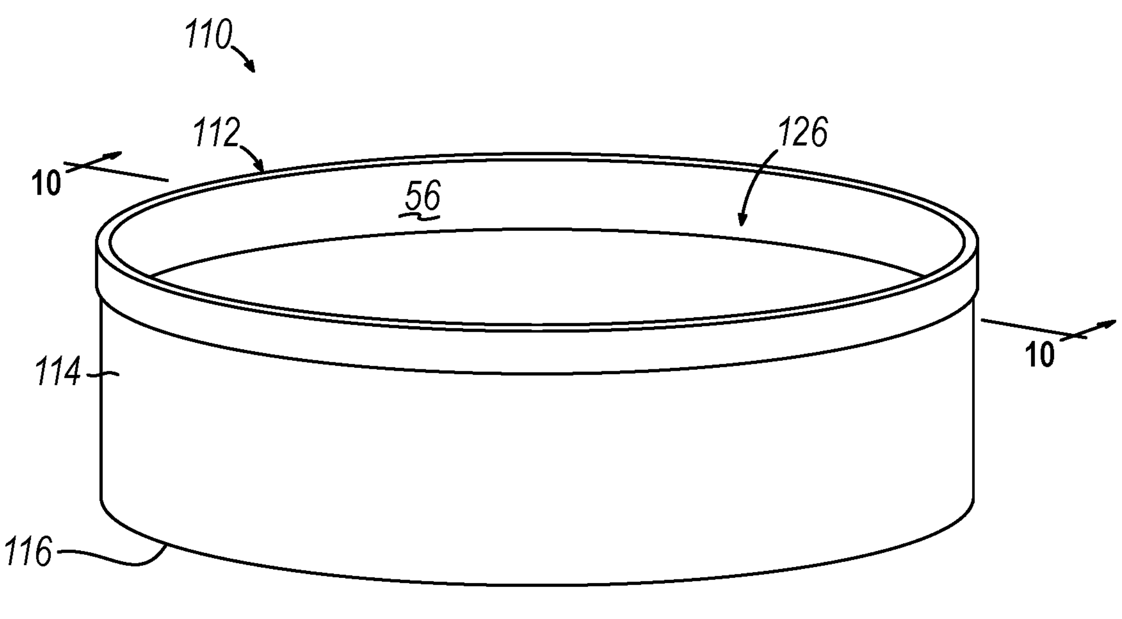
FIG. 9 depicts a perspective view of a second example of a storage system for storing a petroleum product including a storage tank with a second exemplary seal system including an exemplary tank liner seal with a bowled vapor barrier formed of the coated fabric of FIG. 7.
FIG. 10 depicts a perspective sectional view of the storage system of FIG. 9 taken along section line 10-10 of FIG. 9.

FIGS. 9-10 show a second example of a storage system (110) including a storage tank (112) having a tank wall (114) and a tank floor (116). While a roof system, such as a floating roof system, is not those in the present example, it will be appreciated that such roof system may be incorporated into storage system (110) and suspended above tank floor (116) for storing a petroleum product within storage tank (112). Tank wall (114) extends in a vertical direction upward from tank floor (116) to an upper annular wall edge (117) and is generally circular in the present example, although alternative shapes and sizes may differ from storage tank (112) in other examples.

Storage system (110) of the present example further includes a tank liner, which is more particularly shown as a bowled vapor barrier (126) in FIG. 10. In this respect, bowled vapor barrier (126) is configured to inhibit the petroleum product, including any portions thereof, from absorbing through annular vapor barrier (26) to tank wall (114) and/or tank floor (116) and provide chemical resistance from the petroleum product to storage tank (112).

Bowled vapor barrier (126) is received against tank wall (114) and tank floor (116) in the present example and is further secured to storage tank (112) by wrapping around upper annular wall edge (117) and being attached to an outer surface of tank wall (114). Bowled vapor barrier (126), particularly when receiving the petroleum product therein, conforms to the general shape of storage tank (112), but may vary in shape and size depending on the particular shape and size of storage tank as noted above. Notably, bowled vapor barrier (126) in the present example includes a material, such as coated fabric (56), discussed above in greater detail, which is flexible while retaining sufficient durability for use in the above ground storage tank industry. Bowled vapor barrier (126) of coated fabric (56) thus has like properties to coated fabric (56) to those discussed above in greater detail unless otherwise specified herein.

III. THIRD EXAMPLE OF A STORAGE SYSTEM FOR A PETROLEUM PRODUCT

Figure 11:
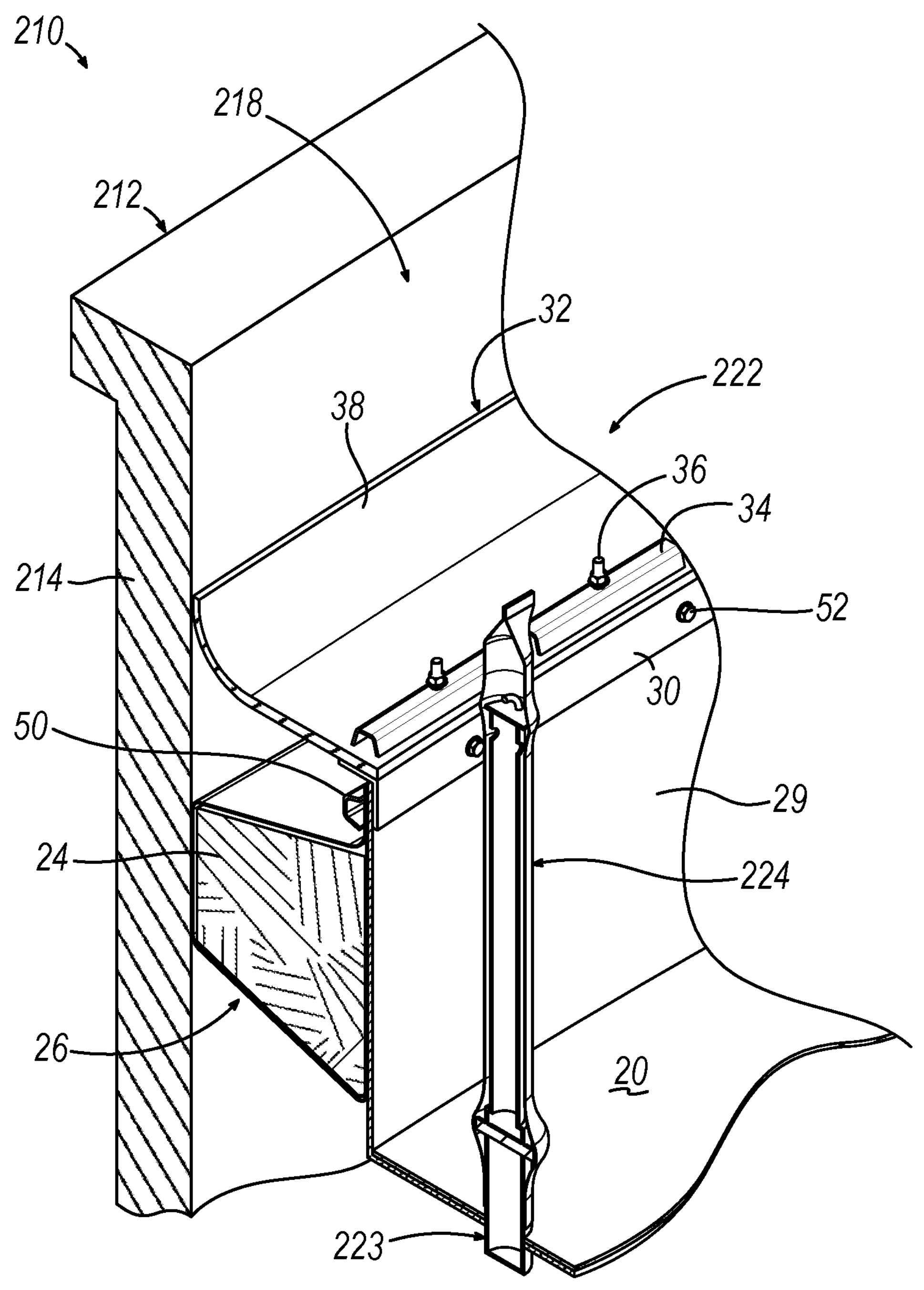
FIG. 11 depicts a perspective sectional view of a third example of a storage system for storing a petroleum product including a storage tank with a third exemplary seal system including a plurality of exemplary leg boot seals with an elongate sleeve vapor barrier formed of the coated fabric of FIG. 7 respectively covering a plurality of support legs of a floating roof.
Figure 12:
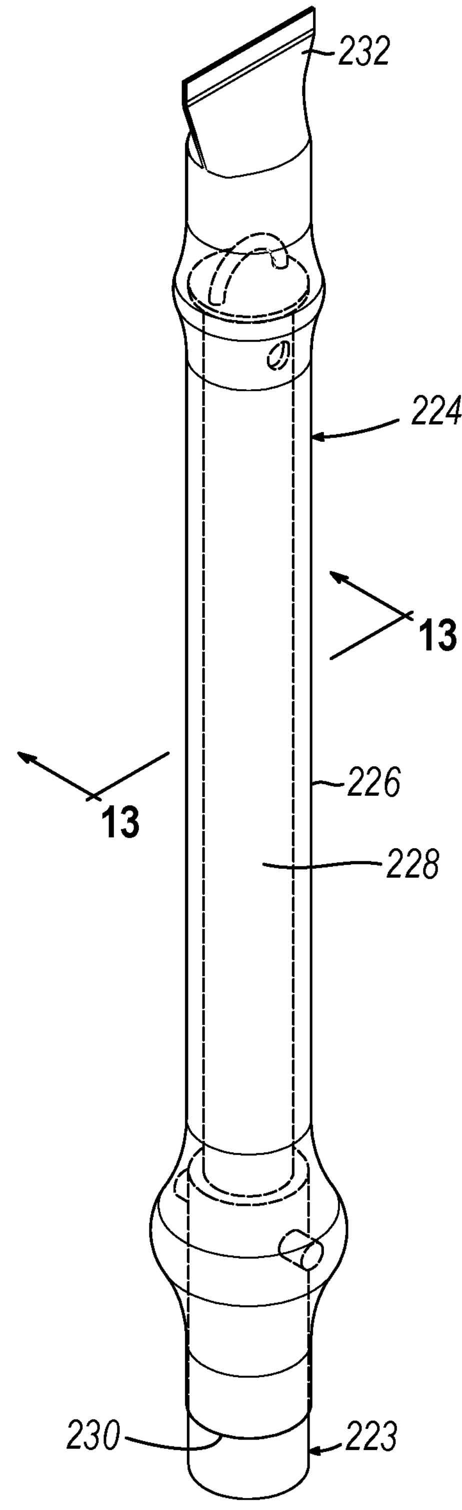
FIG. 12 depicts a perspective view of the leg boot seal of FIG. 11 received on the support leg of FIG. 11.

FIGS. 11-12 show a third example of a storage system (210) including a storage tank (212) having a tank wall (214), a tank floor (not shown), and an exemplary floating roof system (218) suspended above tank floor (not shown) for storing a petroleum product within storage tank (212). Tank wall (214) extends in a vertical direction upward from tank floor (not shown) and is generally circular in the present example, although alternative shapes and sizes may differ from storage tank (212) in other examples. Floating roof system (218) is sized and shaped to accommodate tank wall (214) while sufficiently sealing the petroleum product, particularly associated vapors, within the storage tank (212) to accommodate local regulations while accommodating vertical movement of floating roof system (218) resulting from differing amounts of petroleum product and environmental changes during use. To this end, floating roof system (218) has a floating roof (220) and an exemplary floating roof seal (222), which extends between floating roof (220) and an inner surface of tank wall (214), for sufficient sealing therebetween. Floating roof (220) of the present example further includes plurality of support legs (223) configured to at least allow some portion of petroleum product pass therethrough, such as during vertical movement of floating roof (220). To discourage flow of this portion of petroleum product through support legs (223), each support leg (223) of the present example includes one of a plurality of exemplary leg boot seals (224) covering and fluidly sealing against support legs (223).

Figures 13, 14:
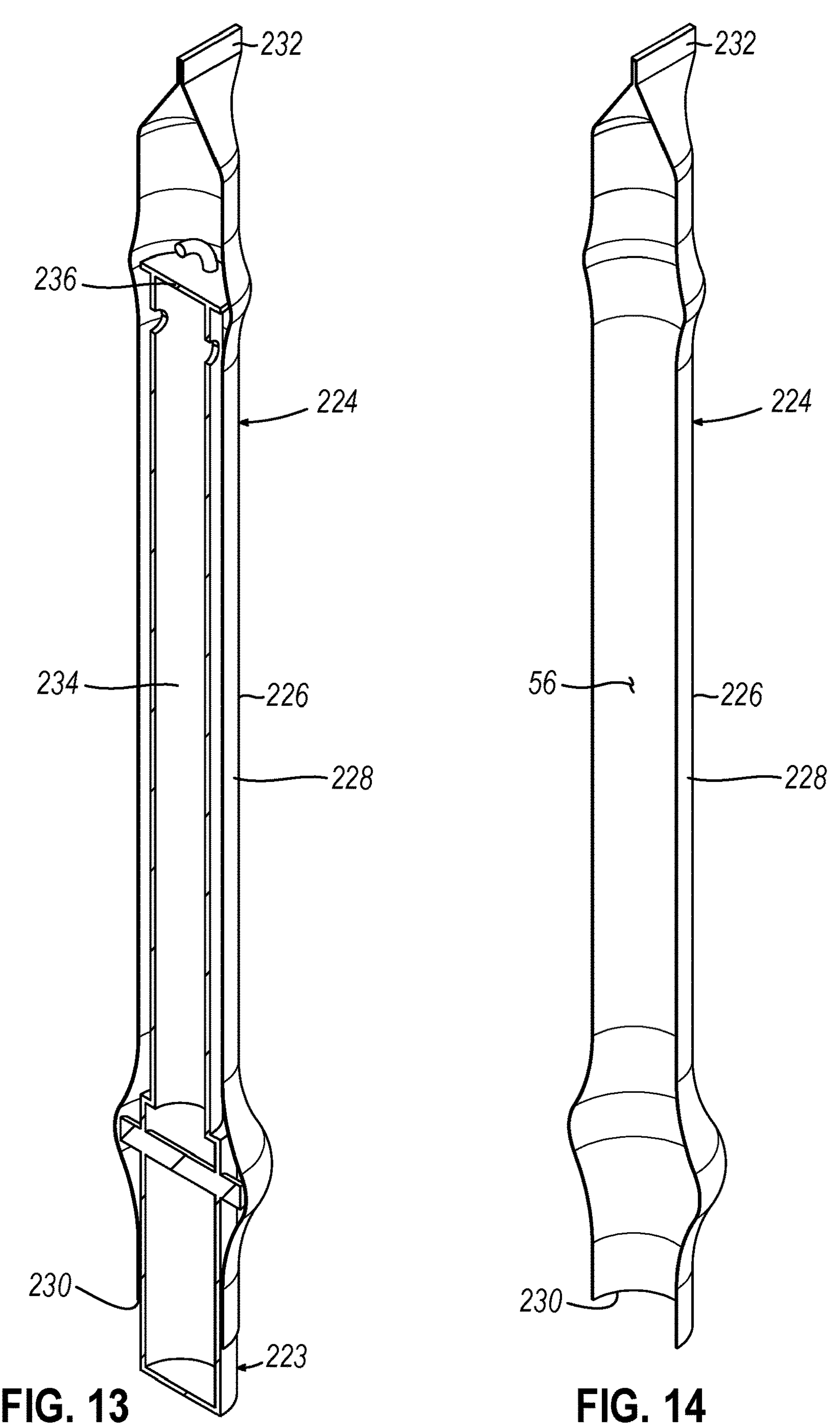
FIG. 13 depicts a perspective sectional view taken along section line 13-13 of FIG. 12 showing the leg boot seal and the support leg of FIG. 12.
FIG. 14 depicts a perspective sectional view taken along section line 13-13 of FIG. 12 showing the leg boot seal of FIG. 12 with the support leg of FIG. 12 hidden for greater clarity of the coated fabric of FIG. 7.

As shown in FIGS. 13-14, leg boot seal (224) includes an elongate sleeve vapor barrier (226) configured to inhibit the petroleum product, including any portions thereof, from absorbing through elongate sleeve vapor barrier (226) and into the surrounding environment. Elongate sleeve vapor barrier (226) includes an elongate sleeve (228) extending from an open sleeve end (230) to a closed sleeve end (232). Open sleeve end (230) is configured to tighten onto support leg (223), whereas closed sleeve end (232) is formed closed in the present example. Elongate sleeve vapor barrier (226) is thus configured to fluidly seal against support leg (223) once installed thereon.

More particularly, support leg (223) of the present example includes an elongate leg body (234) upwardly extending from floating roof (220) (see FIG. 11) along an axis to a terminal leg end (236). Leg body (234) of the present example more particularly includes a plurality of leg members (not shown) configured to telescope relative to each other to extend between "high position" and a "low position" for extending and retracting during use. Elongate vapor barrier (226) received on support leg (223) thus radially surrounds elongate leg body (234) about the axis and covers terminal leg end (236) In addition, open sleeve end (230) tightens to a lower portion of elongate leg body (234), such as by being compressed thereagainst by a clamp, such as a pipe clamp, thereby forming an annular seal between elongate leg body (234) and open sleeve end (230) of elongate sleeve vapor barrier (226). Thus, in the event of any leakage through gaps between telescoping leg members (not shown), elongate sleeve vapor barrier (226) inhibits the petroleum product, including any portions thereof, from leaking through to the surround environment. It will be appreciated that elongate sleeve vapor barrier (226) may take on any other shape to conform as desired to support leg (223) such that the invention is not intended to be unnecessarily limited to the particular size and shape of elongate sleeve vapor barrier (226) in the present example. For example, elongate sleeve vapor barrier (226) may be larger and retain more space about elongate leg body (234). Notably, elongate sleeve vapor barrier (226) in the present example includes a material, such as coated fabric (56), discussed above in greater detail, which is flexible while retaining sufficient durability for use in the above ground storage tank industry. Elongate sleeve vapor barrier (226) in one example is formed by radio frequency welding coated fabric (56) into a cylindrical shape and then sealing (closed sleeve end (232) although alternative methods of formation may be performed. Elongate sleeve vapor barrier (226) of coated fabric (56) thus has like properties to coated fabric (56) to those discussed above in greater detail unless otherwise specified herein.

IV. EXEMPLARY COMBINATIONS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A storage system for a petroleum product, comprising: (a) a vapor barrier including at least one layer having a first ultra high molecular weight polyethylene material configured to inhibit absorption of a petroleum product therethrough and be received against a surface for fluidly sealing thereagainst.

Example 2

The storage system of Example 1, wherein the first ultra high molecular weight polyethylene material is a first ultra high molecular weight polyethylene film layer.

Example 3

The storage system of any one or more of Examples 1 through 2, wherein the first ultra high molecular weight polyethylene film layer a predetermined thickness configured to be flexible.

Example 4

The storage system of Example 3, wherein the predetermined thickness of the first ultra high molecular weight polyethylene film layer is less than approximately 0.25 inch.

Example 5

The storage system of Example 4, wherein the predetermined thickness of the first ultra high molecular weight polyethylene film layer is approximately 0.001 inch to approximately 0.125 inch.

Example 6

The storage system of any one or more of Examples 2 through 5, wherein the at least one layer of the vapor barrier further includes a scrim layer, and wherein the scrim layer is secured to the first ultra high molecular weight polyethylene film layer.

Example 7

The storage system of Example 6, wherein the vapor barrier further includes a second ultra high molecular weight polyethylene film layer, and wherein the scrim layer is secured to the second ultra high molecular weight polyethylene film layer such that the scrim layer is sandwiched between the first and second ultra high molecular weight polyethylene film layers.

Example 8

The storage system of any one or more of Examples 1 through 7, further comprising a floating roof system having a first roof portion, wherein the vapor barrier is configured to envelop the first roof portion to inhibit the petroleum product from contacting to the first roof portion.

Example 9

The storage system of Example 8, wherein the first roof portion includes a foam member, and wherein the vapor barrier is configured to surround the foam member and fluidly seal the foam member from the petroleum product.

Example 10

The storage system of Example 9, wherein the floating roof system further includes a mounting plate, the foam member is attached to the mounting plate, and the vapor barrier covers the foam member such that the vapor barrier is configured to fluidly seal against a tank wall while being further configured to move along the tank wall.

Example 11

The storage system of Example 10, wherein the floating roof system further includes a floating roof configured to be received within a storage tank having the tank wall, wherein each of the mounting plate, the foam member, and the vapor barrier are secured relative to the floating roof.

Example 12

The storage system of Example 8, wherein the first roof portion includes a support leg having an elongate leg body extending along an axis to a terminal leg end, wherein the vapor barrier is received on the elongate leg body to surround the axis and cover the terminal leg end.

Example 13

The storage system of any one or more of Examples 1 through 12, further comprising a storage tank including a tank floor and a tank wall upwardly extending therefrom, wherein the vapor barrier covers at least a portion of the tank floor and at least a portion of the tank wall.

Example 14

The storage system of any one or more of Examples 1 through 13, wherein the vapor barrier is configured to define an annular sleeve having an annular hollow for receiving an annular foam member therein.

Example 15

The storage system of any one or more of Examples 1 through 13, wherein the vapor barrier is configured to define an elongate sleeve having a closed sleeve end and an open sleeve end for receiving a support leg therein through the open sleeve end.

Example 16

A storage system for a petroleum product, comprising: (a) an annular vapor barrier including at least one layer having an ultra high molecular weight polyethylene film layer and defining an annular hollow, wherein the annular vapor barrier is configured to inhibit absorption of a petroleum product therethrough; (b) a mounting plate; and (c) an annular foam member received within the annular vapor barrier and attached to the mounting plate, wherein the annular vapor barrier is configured to surround the annular foam member and fluidly seal the annular foam member from the petroleum product, wherein the annular vapor barrier covers the annular foam member such that the annular vapor barrier is configured to fluidly seal against a tank wall while being further configured to move along the tank wall.

Example 17

The storage system of Example 16, wherein the first ultra high molecular weight polyethylene film layer has a predetermined thickness of less than approximately 0.25 inch and is configured to be flexible.

Example 18

The storage system of any one or more of Examples 16 through 17, wherein the at least one layer of the vapor barrier further includes a scrim layer, and wherein the scrim layer is secured to the ultra high molecular weight polyethylene film layer.

Example 19

A method of fluidly sealing a petroleum product from an environment with a storage system, the storage system including a vapor barrier with at least one layer having a first ultra high molecular weight polyethylene material, the method comprising: (a) inhibiting absorption of the petroleum product through the vapor barrier thereby fluidly sealing the petroleum product in the storage system.

Example 20

The method of Example 19, further comprising surrounding a foam member with the vapor barrier and further inhibiting absorption of the petroleum product through the vapor barrier to the foam member.

Example 21

A storage system for a petroleum product, comprising: (a) a seal, including: (i) a member; and (ii) a vapor barrier surrounding the member and having a flexible material configured to fluidly seal the member therein, wherein the vapor barrier includes a polyethylene material.

Example 22

The storage system of Example 21, wherein the polyethylene material is an ultra high molecular weight material.

Example 23

The storage system of Example 22, wherein the ultra high molecular weight material is an ultra high molecular weight film.

Example 24

The storage system of Example 23, wherein the ultra high molecular weight film has a predetermined thickness configured to be flexible.

Example 25

The storage system of Example 24, wherein the predetermined thickness is configured is to be flexible for seal applications while retaining sufficient durability for use in the above ground storage tank industry.

Example 26

The storage system of any one or more of Examples 21 through 25, further comprising a tank body configured to receive the seal thereagainst.

Example 27

A seal, comprising: (a) a member; and (b) a vapor barrier surrounding the member and having a flexible material configured to fluidly seal the member therein, wherein the vapor barrier includes a polyethylene material.

Example 28

The seal of Example 27, wherein the polyethylene material is an ultra high molecular weight material.

Example 29

The seal of Example 28, wherein the ultra high molecular weight material is an ultra high molecular weight film.

Example 30

The seal of Example 29, wherein the ultra high molecular weight film has a predetermined thickness configured to be flexible.

Example 31

The seal of Example 30, wherein the predetermined thickness is configured is to be flexible for seal applications while retaining sufficient durability for use in the above ground storage tank industry.

Example 32

A method of sealing a seal for storage of a petroleum product, the seal including a member and a vapor barrier surrounding the member and having a flexible material configured to fluidly seal the member therein, wherein the vapor barrier includes a polyethylene material, the method comprising: (a) engaging the seal against a tank body of a tank.

Example 33

A method of manufacturing a seal, comprising: (a) surrounding a member with a vapor barrier with having a flexible polyethylene material; (b) fluidly sealing the member within the vapor barrier; and (c) manufacturing the seal.

Example 34

The method of Example 33, wherein the polyethylene material is an ultra high molecular weight material.

Example 35

The method of Example 34, wherein the ultra high molecular weight material is an ultra high molecular weight film.

Example 36

The method of Example 35, wherein the ultra high molecular weight film has a predetermined thickness configured to be flexible.

Example 37

The method of Example 36, wherein the predetermined thickness is configured to be flexible for seal applications while retaining sufficient durability for use in the above ground storage tank industry.

Example 38

An apparatus, comprising: (a) a vapor barrier configured to inhibit absorption of fluid therethrough, wherein, wherein the vapor barrier includes a polyethylene material.

Example 39

The apparatus of Example 38, wherein the polyethylene material is an ultra high molecular weight material.

Example 40

The apparatus of Example 39, wherein the ultra high molecular weight material is an ultra high molecular weight film.

Example 41

The apparatus of Example 40, wherein the ultra high molecular weight film has a predetermined thickness configured to be flexible.

Example 42

The apparatus of Example 41, wherein the predetermined thickness is configured to be flexible while retaining sufficient durability for use in the above ground storage tank industry.

Example 43

The apparatus of any one or more of Examples 38 through 42, wherein the vapor barrier includes a fabric.

V. MISCELLANEOUS

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A storage system for a petroleum product, comprising:
(a) a vapor barrier including at least one layer having a first ultra high molecular weight polyethylene film layer, a scrim layer, and a second ultra high molecular weight polyethylene film layer; wherein the scrim layer is secured to the first ultra high molecular weight polyethylene film layer and the second ultra high molecular weight polyethylene film layer such that the scrim layer is sandwiched between the first and second ultra high molecular weight polyethylene film layers,
wherein the first ultra high molecular weight polyethylene film layer is configured to be received against a surface for fluidly sealing thereagainst, and
wherein the second ultra high molecular weight polyethylene film layer is exposed and thereby configured to receive the petroleum product thereagainst such that the vapor barrier is configured to inhibit absorption of the petroleum product therethrough.

2. The storage system of claim 1, further comprising a storage tank including a tank floor and a tank wall upwardly extending therefrom, wherein the vapor barrier covers at least a portion of the tank floor and at least a portion of the tank wall.

3. The storage system of claim 1, wherein the vapor barrier is configured to define an annular sleeve having an annular hollow for receiving an annular foam member therein.

4. The storage system of claim 1, wherein the vapor barrier is configured to define an elongate sleeve having a closed sleeve end and an open sleeve end for receiving a support leg therein through the open sleeve end.

5. The storage system of claim 1, wherein the vapor barrier has a collective predetermined material thickness of from approximately 0.02 inches to approximately 0.5 inches.

6. The storage system of claim 1, wherein the first ultra high molecular weight polyethylene film layer has a predetermined thickness configured to be flexible.

7. The storage system of claim 6, wherein the predetermined thickness of the first ultra high molecular weight polyethylene film layer is less than approximately 0.25 inch.

8. The storage system of claim 7, wherein the predetermined thickness of the first ultra high molecular weight polyethylene film layer is approximately 0.001 inch to approximately 0.125 inch.

9. The storage system of claim 1, further comprising a floating roof system having a first roof portion, wherein the vapor barrier is configured to envelop the first roof portion to inhibit the petroleum product from contacting to the first roof portion.

10. The storage system of claim 9, wherein the first roof portion includes a foam member, and wherein the vapor barrier is configured to surround the foam member and fluidly seal the foam member from the petroleum product.

11. The storage system of claim 10, wherein the floating roof system further includes a mounting plate, the foam member is attached to the mounting plate, and the vapor barrier covers the foam member such that the vapor barrier is configured to fluidly seal against a tank wall while being further configured to move along the tank wall.

12. The storage system of claim 11, wherein the floating roof system further includes a floating roof configured to be received within a storage tank having the tank wall, wherein each of the mounting plate, the foam member, and the vapor barrier are secured relative to the floating roof.

13. The storage system of claim 9, wherein the first roof portion includes a support leg having an elongate leg body extending along an axis to a terminal leg end, wherein the vapor barrier is received on the elongate leg body to surround the axis and cover the terminal leg end.

14. A storage system for a petroleum product, comprising:

(a) a vapor barrier including at least one layer having a first ultra high molecular weight polyethylene film layer, a scrim layer, and a second ultra high molecular weight polyethylene film layer; wherein the first ultra high molecular weight polyethylene film layer is configured to inhibit absorption of a petroleum product therethrough and be received against a surface for fluidly sealing thereagainst; and wherein the scrim layer is secured to the first ultra high molecular weight polyethylene film layer and the second ultra high molecular weight polyethylene film layer such that the scrim layer is sandwiched between the first and second ultra high molecular weight polyethylene film layers; and (b) a floating roof system having a first roof portion, wherein the vapor barrier is configured to envelop the first roof portion to inhibit the petroleum product from contacting to the first roof portion;

wherein the first roof portion includes a foam member, and wherein the vapor barrier is configured to surround the foam member and fluidly seal the foam member from the petroleum product; and wherein the second ultra high molecular weight polyethylene film layer is an outermost layer of the vapor barrier.

15. The storage system of claim 14, wherein the vapor barrier has a collective predetermined material thickness of from approximately 0.02 inches to approximately 0.5 inches.

16. The storage system of claim 14, wherein the floating roof system further includes a mounting plate, the foam member is attached to the mounting plate, and the vapor barrier covers the foam member such that the vapor barrier is configured to fluidly seal against a tank wall while being further configured to move along the tank wall.

17. The storage system of claim 16, wherein the floating roof system further includes a floating roof configured to be received within a storage tank having the tank wall, wherein each of the mounting plate, the foam member, and the vapor barrier are secured relative to the floating roof.

18. The storage system of claim 14, wherein the floating roof system further includes a floating roof configured to be received within a storage tank having a tank wall, wherein the floating roof further comprises a wedge wiper seal extending radially outwardly from the floating roof to also engage with the tank wall.

19. The storage system of claim 18, wherein the wedge wiper seal is configured to wipe petroleum product from the tank wall during upward and downward movement of floating roof.

20. The storage system of claim 18, wherein the wedge wiper seal is formed from one or more ultra high molecular weight polyethylene film layers.

* * * * *